US008924172B2

(12) United States Patent
Hasegawa et al.

(10) Patent No.: US 8,924,172 B2
(45) Date of Patent: Dec. 30, 2014

(54) POWER CONSUMPTION DISPLAY UNIT FOR MACHINE TOOL

(75) Inventors: Koji Hasegawa, Ichinomiya (JP); Hirotaka Sugiura, Nishio (JP); Takeshi Kojima, Nagoya (JP)

(73) Assignee: Jtekt Corporation, Osaka-shi (JP)

( * ) Notice: Subject to any disclaimer, the term of this patent is extended or adjusted under 35 U.S.C. 154(b) by 451 days.

(21) Appl. No.: 13/273,412

(22) Filed: Oct. 14, 2011

(65) Prior Publication Data
US 2012/0109551 A1 May 3, 2012

(30) Foreign Application Priority Data

Oct. 27, 2010 (JP) ................. 2010-241136

(51) Int. Cl.
G01R 21/00 (2006.01)
G01R 21/06 (2006.01)
G05B 19/409 (2006.01)
G05B 15/02 (2006.01)
(52) U.S. Cl.
CPC .............. *G05B 19/409* (2013.01); *G05B 15/02* (2013.01); *G05B 2219/23102* (2013.01); *G05B 2219/23179* (2013.01); *G05B 2219/31414* (2013.01)
USPC .......................................................... 702/61
(58) Field of Classification Search
CPC .................................. G05B 19/18; B23Q 15/00
USPC .......................................................... 702/61
See application file for complete search history.

(56) References Cited

U.S. PATENT DOCUMENTS 6,526,360 B1 * 2/2003 Ito et al. ..................... 702/60
2010/0072940 A1 * 3/2010 Iwashita et al. ............. 318/671

FOREIGN PATENT DOCUMENTS

JP 2000-206150 A 7/2000
JP 2001-174490 A 6/2001
JP 2008-097128 A 4/2008

OTHER PUBLICATIONS

Partial English language translation of the Office Action issued Jun. 3, 2014 in Japanese Patent Application No. 2010-241136.

* cited by examiner

*Primary Examiner* — Sujoy Kundu
*Assistant Examiner* — Steven J Malone
(74) *Attorney, Agent, or Firm* — Oblon, Spivak, McClelland, Maier & Neustadt, L.L.P.

(57) ABSTRACT

A power consumption display unit for a machine tool includes: machining state determining means for determining, when a main power switch used to supply power to a machine tool is ON, whether the machine tool is in a machining state where a machining program is executed to machine a workpiece or in a non-machining state where the machining program is not executed; power consumption measuring means for measuring a power consumption of the machine tool during a period where the machine tool is determined to be in the non-machining state by the machining state determining means; and display means for displaying the power consumption measured by the power consumption measuring means.

20 Claims, 4 Drawing Sheets

Total Power Consumption (Daily)

| Standby Power Consumption | Operation Standby | 6.578 kWh |
|---|---|---|
| | Operation Standby Off | 0.005 kWh |
| Total Power Consumption | | 39.572 kWh |

Individual Power Consumptions (Daily)

| | | Grinding Wheel Shaft | NC Drive Shaft | Coolant Pump | Hydraulic Pump | Lubrication Pump | Others |
|---|---|---|---|---|---|---|---|
| Standby Power Consumption | Operation Standby | 2.788 kWh | 0.598 kWh | 1.992 kWh | 0.400 kWh | 0.400 kWh | 0.400 kWh |
| | Operation Standby Off | 0.000 kWh | 0.000 kWh | 0.000 kWh | 0.000 kWh | 0.000 kWh | 0.005 kWh |
| Total Power Consumption | | 22.444 kWh | 2.704 kWh | 9.012 kWh | 1.800 kWh | 1.800 kWh | 1.812 kWh |

Fig. 4

POWER CONSUMPTION DISPLAY UNIT FOR MACHINE TOOL

INCORPORATION BY REFERENCE/RELATED APPLICATION

This application claims priority to Japanese Patent Application No. 2010-241136 filed on Oct. 27, 2010 the disclosure of which, including the specification, drawings and abstract, is incorporated herein by reference in its entirety.

BACKGROUND OF THE INVENTION

1. Field of the Invention

The invention relates to a power consumption display unit for a machine tool.

2. Discussion of Background

For example, U.S. Pat. No. 6,526,360 describes detecting power consumption in each cycle of a repeated operation and then displaying the power consumption of a power-consuming element or a machine in each cycle.

Recently, there have been demands for reduction of wasteful power consumption in a machine tool. However, it is difficult to ascertain how much power is wastefully consumed and where in a machine tool power is wastefully consumed.

SUMMARY OF THE INVENTION

The invention is made in light of the above-described circumstances, and it is an object of the invention to provide a power consumption display unit for a machine tool, which makes it possible to visually confirm wasteful power consumption.

According to a feature of an example of the invention, the power consumption in the non-machining state is displayed, and therefore the operators are able to ascertain how much power is possibly wasted. However, the non-machining state includes a state immediately before the machining state, and the power consumption in this state is not a waste. Therefore, it cannot be said that the power consumption in the non-machining state is entirely a waste, but there is a possibility that the power consumption may be at least partially a waste. Therefore, the invention makes it possible to visually confirm the power consumption that may be possibly a waste. Thus, the operators are given an opportunity to examine a wasteful part of the power consumption. This creates a possibility to reduce the power consumption.

It is to be understood that "power consumption" is a value obtained by multiplying the power consumed per unit time by the length of time. That is, each "power consumption" in the invention is intended to signify also the amount of power consumed per unit time. Further, the power consumption measuring means may include means for measuring power consumption and means for measuring time, which are separately provided, and calculate the power consumption during a prescribed time period by multiplying the measured electric energy by the measured time.

According to another feature of an example of the invention, the non-machining state is divided into the operation standby mode and the operation standby OFF mode, and the power consumption in the operation standby mode and that in the operation standby OFF mode are displayed. Thus, the operators are able to ascertain in more detail how power is consumed. As a result, wasteful power consumption is further reduced.

According to a further feature of an example of the invention, the power consumptions of multiple power-consuming components of the machine tool in the non-machining state are displayed, and therefore the operators are able to ascertain which power-consuming component wastefully consumes power.

In general, the power consumptions of a rotational drive shaft, NC drive shafts, and pumps account for a significant fraction of the total power consumption of the machine tool. According to another feature of the invention, by way of example, the operators are able to ascertain the wasteful power consumption included in the power consumptions of these elements, which leads to reduction of the power consumption. Further, with regard to "pumps", for example, the power consumptions of a coolant pump, a hydraulic pump, and a lubricant pump may be individually displayed. In this case, the power wastefully consumed by each pump is reduced.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 4 is a view showing a display screen of a display unit.

DETAILED DESCRIPTION OF EMBODIMENTS

Hereinafter, embodiments of the invention will be described with reference to the accompanying drawings.

A power consumption display unit for a machine tool according to an example embodiment of the invention will be described with reference to the accompanying drawings. In the following, a grinding machine used to machine, for example, crankshafts will be described as an example of a machine tool. The grinding machine is constituted of a spindle that supports a crankshaft as a workpiece and operates under numerical control (NC) to rotate the crankshaft, a grinding wheel shaft that supports a grinding wheel and rotates the grinding wheel, and an X-axis drive shaft and a Z-axis drive shaft that operate under numerical control (NC) to cause a relative movement between the workpiece and the grinding wheel. As a matter of course, machine tools in the invention are not limited to the above-described grinding machine, and may be grinding machines used to grind workpieces other than crankshafts, or may be machine tools other than grinding machines, such as lathe turning machines, and machining centers.

Figure 1:
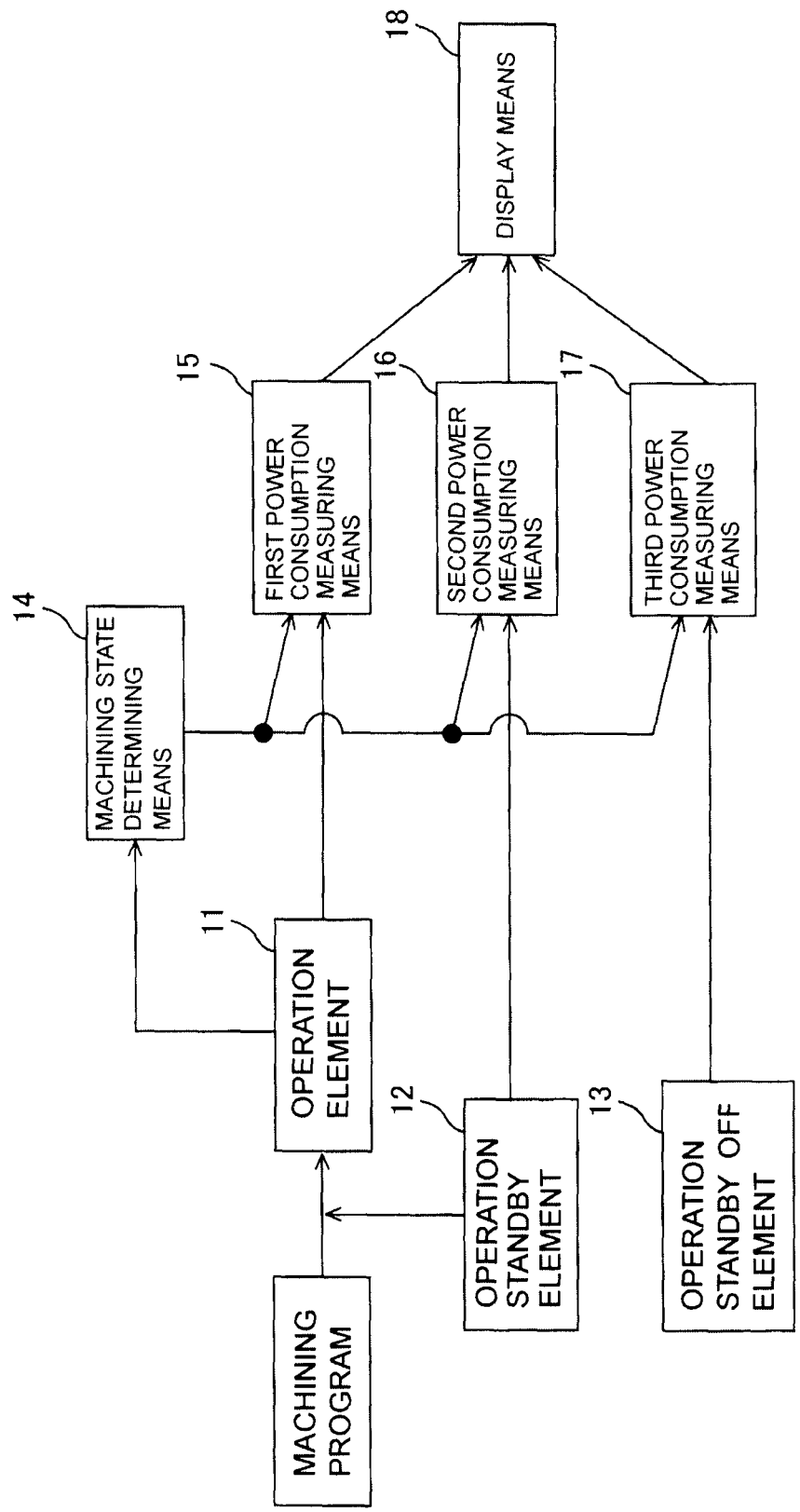
FIG. 1 is a functional block diagram of a power consumption display unit for a machine tool.

The functional configuration of the power consumption display unit for a machine tool according to the example embodiment will be described with reference to the functional block diagram in FIG. 1. As shown in FIG. 1, the functional configuration is constituted of operation elements 11 that are "first power-consuming element" of the machine tool, operation standby elements 12 that are "second power-consuming element" of the machine tool, operation standby OFF elements 13 that are "third power-consuming element" of the machine tool, machining state determining means 14, first electric energy measuring means 15, second electric energy measuring means 16, third electric energy measuring means 17, and display means 18.

The operation elements 11 are elements that consume power in a machining state where a workpiece is machined through execution of a machining program, when a main power switch is ON. Examples of the operation elements 11 include NC drive shafts that cause relative movements between a grinding wheel and a workpiece in the machining state, a grinding wheel shaft that rotates the grinding wheel in the machining state, a spindle that rotates the workpiece in the machining state, a coolant pump used to supply coolant to a ground portion of the workpiece during grinding, a hydraulic pump used to drive, for example, a device used to clamp the workpiece, a lubricant pump that supplies lubricant to, for example, a bearing for the spindle, a display unit, and a control circuit.

The operation standby elements 12 are elements that consume power, in a non-machining state where the machining program is not executed, in order to keep the machine tool in an operation standby mode where the machining program is ready to be executed upon issuance of a command to execute the machining program. Examples of the operation standby elements 12 include the grinding wheel shaft that rotates the grinding wheel, the NC drive shafts that keep the grinding wheel and the workpiece ready to move relative to each other, the coolant pump, the hydraulic pump, the lubricant pump, the display unit, and the control circuit. As described above, some components are included in both the operation elements 11 and the operation standby elements 12. The operation standby elements 12 and the operation elements 11 consume power for different purposes. Therefore, whether these components are regarded as the operation elements 11 or as the operation standby elements 12 is determined depending on the purpose of power consumption.

The operation standby OFF elements 13 are elements that are independent of execution of the machining program, in the non-machining state. For example, elements that consume power when the machine tool is stopped for emergency correspond to the operation standby OFF elements 13. Examples of the operation standby OFF elements 13 include the display unit and the control circuit.

When the main power switch used to supply power to the machine tool is ON, the machining state determining means 14 determines whether the machine tool is in the machining state where the machining program is executed to machine a workpiece or in the non-machining state where the machining program is not executed. Further, when the machine tool is in the non-machining state, the machining state determining means 14 determines whether the machine tool is in the operation standby mode where the operation standby elements 12 consume power and the operation elements 11 do not consume power, or in an operation standby OFF mode where the operation standby OFF elements 13 consume power and neither the operation elements 11 nor the operation standby elements 12 consume power.

The first electric energy measuring means 15 measures the amount of power consumed by each operation element 11. The second electric energy measuring means 16 measures the amount of power consumed by each operation standby element 12. The third electric energy measuring means 17 measures the amount of power consumed by each operation standby OFF element 13. As mentioned above, the operation elements 11, the operation standby elements 12, and the operation standby OFF elements 13 include some components in common in the actual structure of the machine tool. However, whether these components are each regarded as the operation element 11, as the operation standby element 12 or as the operation standby OFF element 13 is determined based upon the state of the machine tool. Therefore, it is possible to measure the power consumption of each of these components when it is regarded as each of the operation element 11, the operation standby element 12, and the operation standby OFF element 13. Further, it is to be noted that all the electric energy measuring means 15 to 17 signify one and the same electric energy measuring means if they are used for a component that is included in the operation elements 11, the operation standby elements 12, and the operation standby OFF elements 13. Using the first electric energy measuring means 15, the second electric energy measuring means 16, and the third electric energy measuring means 17 makes it possible to measure the power consumption in each of the machining state and the non-machining state, and further makes it possible to measure the power consumption in each of the operation standby mode and the operation standby OFF mode that are included in the non-machining state. It is to be noted that the first electric energy measuring means 15, the second electric energy measuring means 16, and the third electric energy measuring means 17 each may include means for directly measuring electric energy, or may include power measuring means for measuring the power consumed by elements 11, 12 and 13, respectively, and time measuring means for measuring time, which are separately provided, and calculate the power consumption by multiplying the measured electric energy by the measured time.

The display means 18 displays, on its display screen, the various power consumptions measured by the first electric energy measuring means 15, the second electric energy measuring means 16, and the third electric energy measuring means 17. More specifically, the display means 18 displays the power consumptions of the operation elements 11 (i.e., the power consumptions in the machining state), the power consumptions of the operation standby elements 12 (i.e., the power consumptions in the operation standby mode), and the power consumptions of the operation standby OFF elements 13 (i.e., the power consumptions in the operation standby OFF mode). Further, the display means 18 displays the total value in each state and the power consumption of each of multiple power-consuming components in each state. The multiple power-consuming components include the grinding wheel shaft, the NC drive shafts (including the spindle that rotatably supports the workpiece, the X-axis drive shaft, and the Z-axis drive shaft), the coolant pump, the hydraulic pump, the lubricant pump, and other components.

Figure 2:
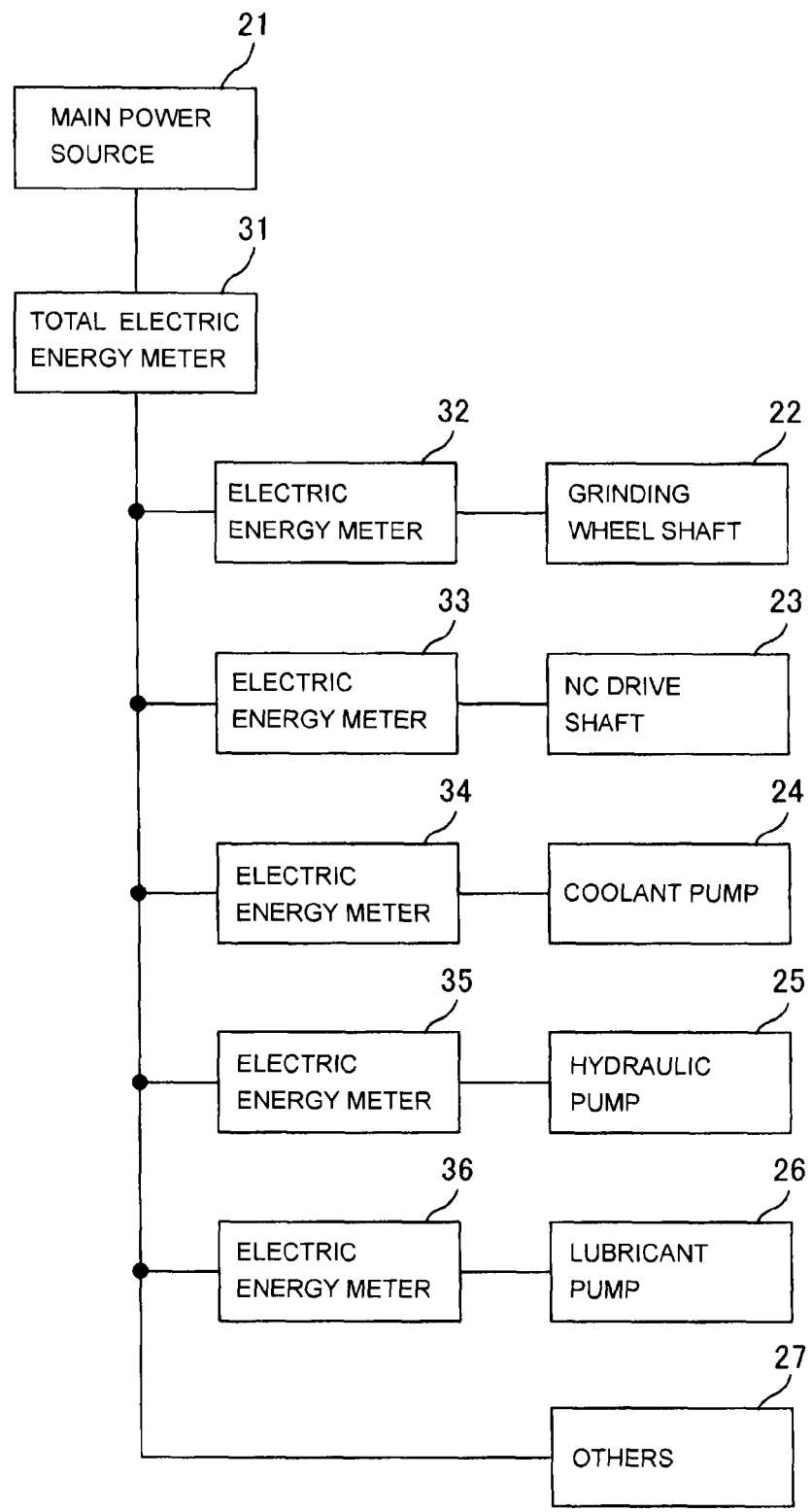
FIG. 2 is a block diagram illustrating structural elements of the machine tool.

Next, the actual block diagram of the machine tool, of which the power consumption is displayed, will be described with reference to FIG. 2. As shown in FIG. 2, the machine tool includes a main power source switch 21, a grinding wheel shaft 22, NC drive shafts 23 (including a spindle, an X-axis drive shaft, and a Z-axis drive shaft), a coolant pump 24, a hydraulic pump 25, a lubricant pump 26, and other components 27 including a display unit. Further, the machine tool includes a total electric energy meter 31, an electric energy meter 32 that measures the power consumption of the grinding wheel shaft 22, an electric energy meter 33 that measures the power consumption of the NC drive shafts 23, an electric energy meter 34 that measures the power consumption of the coolant pump 24, an electric energy meter 35 that measures the power consumption of the hydraulic pump 25, and an electric energy meter 36 that measures the power consumption of the lubricant pump 26.

In the following, the correspondence relation between the elements in the functional block diagram illustrated in FIG. 1 and the components in the block diagram in FIG. 2 will be described. The grinding wheel shaft 22, the NC drive shafts 23, the coolant pump 24, the hydraulic pump 25, and the lubricant pump 26 are each classified as both the operation element 11 and the operation standby element 12. At least one of the other components 27 including the display unit is classified as all of the operation element 11, the operation standby element 12, and the operation standby OFF element 13. The electric energy meters 32 to 36 shown in FIG. 2 each correspond to any of the first electric energy measuring means 15, the second electric energy measuring means 16, and the third electric energy measuring means 17. The display unit corresponds to the display means 18.

Figure 3:
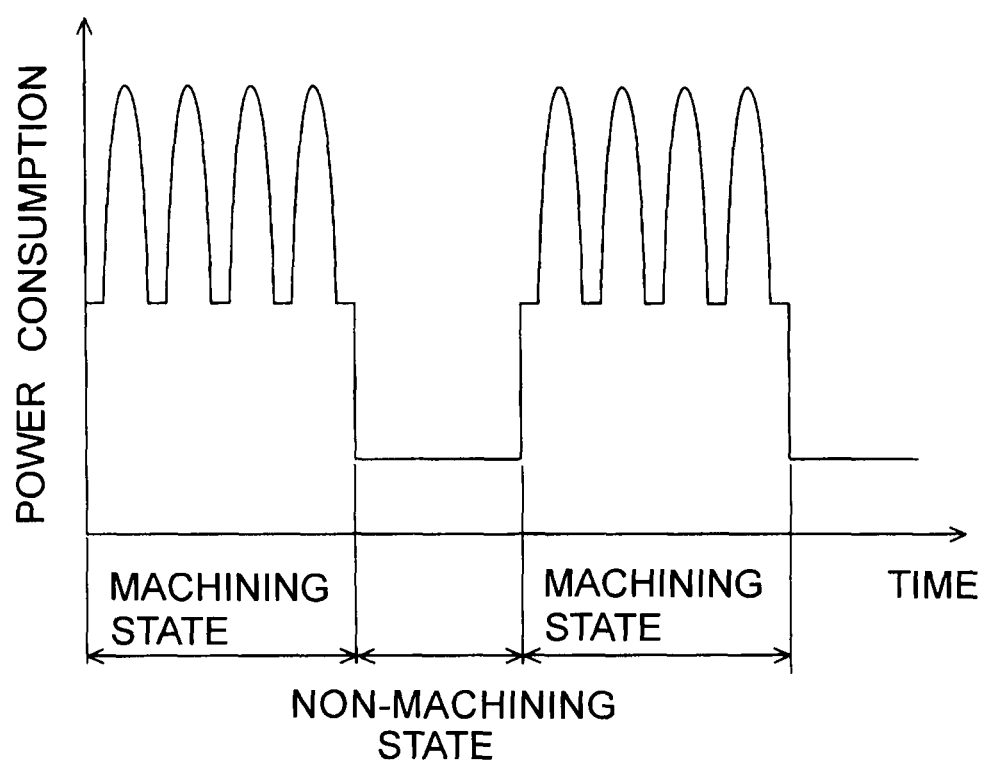
FIG. 3 is a time chart illustrating power consumption with respect to elapsed time in a case where multiple workpieces are machined one by one, showing both a machining state where workpieces are machined and a non-machining state where workpieces are not machined.

Next, the power consumption in the machining state and that in the non-machining state will be described with reference to FIG. 3. In the example illustrated in FIG. 3, the multiple workpieces are crankshafts that are machined one by one. As shown in FIG. 3, in the machining state, the same machining process is performed on four portions of each crankshaft, and therefore the power consumption reaches its peak four times during machining of one crankshaft. During a period from completion of machining of one crankshaft to start of machining of next crankshaft, the machine tool is placed in the operation standby mode that is one of the modes in the non-machining state and thus the power consumption is kept smaller than that in the machining state.

Next, the information displayed on the display screen of the display means 18 will be described with reference to FIG. 4. As shown in FIG. 4, as information regarding the total power consumption of the overall machine tool, the daily power consumption in the operation standby mode in the non-machining state, the daily power consumption in the operation standby OFF mode in the non-machining state, and the total daily power consumption are displayed in the upper section of the display screen. That is, the daily power consumption in the machining state is obtained by subtracting the daily power consumptions in the operation standby mode and operation standby OFF mode from the total daily power consumption.

Further, the daily power consumption in the operation standby mode in the non-machining state, the daily power consumption in the operation standby OFF mode in the non-machining state, and the total daily power consumption of each of the components of the machine tool (i.e., the grinding wheel shaft 22, the NC drive shafts 23, the coolant pump 24, the hydraulic pump 25, the lubricant pump 26, and others) are displayed in the lower section of the display screen.

Because the power consumptions in the non-machining state are displayed on the display screen of the display means 18, operators are able to ascertain how much power is possibly wasted. However, the non-machining state includes a state immediately before the machining state, and the power consumption in this state is not a waste. Therefore, it cannot be said that the power consumption in the non-machining state is entirely a waste, but there is a possibility that the power consumption may be at least partially a waste. Therefore, if the power consumption that may possibly a waste is visually confirmed, the operators are given an opportunity to examine a wasteful part of the power consumption. This creates a possibility to reduce the power consumption.

In particular, the non-machining state is divided into the operation standby mode and the operation standby OFF mode, and the power consumption in the operation standby mode and that in the operation standby OFF mode are individually displayed on the display screen of the display means 18. If the power consumption in the operation standby mode and that in the operation standby OFF mode are thus displayed, the operators are able to ascertain in more detail how power is consumed. As a result, wasteful power consumption is further reduced.

Further, the power consumption of each of the multiple power-consuming components of the machine tool in the non-machining state is displayed on the display screen of the display means 18. Therefore, the operators are able to ascertain which power-consuming component consumes power wastefully. The multiple power-consuming components displayed on the display screen are the grinding wheel shaft 22, the NC drive shafts 23, the coolant pump 24, the hydraulic pump 25, and the lubricant pump 26. The power consumptions of these components account for a significant fraction of the total power consumption of the machine tool. Therefore, reducing the wasteful power consumption included in the power consumptions of these components produces considerably advantageous effects. It is possible to reduce wasteful power consumption, by, for example, reducing the rotation speed of the grinding wheel shaft, stopping the coolant pump 24, and reducing the discharge pressure of the lubricant pump 26.

What is claimed is:

1. A power consumption display unit for a machine tool that machines a workpiece according to a machining program, comprising:

machining state determining means for determining, when a main power switch used to supply power to the machine tool is ON, whether the machine tool is in a machining state where the machining program is executed to machine the workpiece or in a non-machining state where the machining program is not executed;

power consumption measuring means for measuring a power consumption of the machine tool during a period where the machine tool is determined to be in the non-machining state by the machining state determining means; and display means for displaying the power consumption measured by the power consumption measuring means, wherein the machine tool includes:

a first power-consuming element that consumes power in the machining state where the machining program is executed to machine the workpiece;

a second power-consuming element that consumes, when the machine tool is in the non-machining state, in order to keep the machine tool in an operation standby mode where the machining program is ready to be executed upon issuance of a command to execute the machining program; and a third power-consuming element that consumes, when the machine tool is in the non-machining state, power independently of execution of the machining program, the machining state determining means determines, when the machine tool is in the non-machining state, whether the machine tool is in the operation standby mode where the first power-consuming element does not consume power and the second power-consuming element consumes power, or in an operation standby OFF mode where the first and second power-consuming elements do not consume power and the third power-consuming element consumes power, the power consumption measuring means measures at least one of a power consumption in the operation standby mode and a power consumption in the operation standby OFF mode, and the third power-consuming element includes at least the display means.

2. The power consumption display unit for a machine tool according to claim 1, wherein:
the power consumption measuring means measures a power consumption of each of multiple power-consuming components of the machine tool in the non-machining state; and
the display means displays the power consumptions of the respective power-consuming components.

3. The power consumption display unit for a machine tool according to claim 2, wherein the power-consuming components include at least one of a rotational drive shaft that rotatably supports a workpiece or a tool, a NC drive shaft that causes a relative movement between the workpiece and the tool, and a pump.

4. The power consumption display unit for a machine tool according to claim 3, wherein the display means displays at least one of:
total daily power consumption of the display means and the at least one of the rotational drive shaft that rotatably supports the workpiece or the tool, the NC drive shaft that causes the relative movement between the workpiece and the tool, and the pump in the operation standby mode in the non-machining state,
total daily power consumption of the display means and the at least one of the rotational drive shaft that rotatably supports the workpiece or the tool, the NC drive shaft that causes the relative movement between the workpiece and the tool, and the pump in the operation standby OFF mode in the non-machining state, and
total daily power consumption of the display means and the at least one of the rotational drive shaft that rotatably supports the workpiece or the tool, the NC drive shaft that causes the relative movement between the workpiece and the tool, and the pump.

5. The power consumption display unit for a machine tool according to claim 4, wherein the display means displays at least one of:
daily power consumption in the operation standby mode in the non-machining state separately for each of the display means and the at least one of the rotational drive shaft that rotatably supports the workpiece or the tool, the NC drive shaft that causes the relative movement between the workpiece and the tool, and the pump,
daily power consumption in the operation standby OFF mode in the non-machining state separately for each of the display means and the at least one of the rotational drive shaft that rotatably supports the workpiece or the tool, the NC drive shaft that causes the relative movement between the workpiece and the tool, and the pump, and
daily power consumption separately for each of the display means and the at least one of the rotational drive shaft that rotatably supports the workpiece or the tool, the NC drive shaft that causes the relative movement between the workpiece and the tool, and the pump.

6. The power consumption display unit for a machine tool according to claim 3, wherein the display means displays at least one of:
daily power consumption in the operation standby mode in the non-machining state separately for each of the display means and the at least one of the rotational drive shaft that rotatably supports the workpiece or the tool, the NC drive shaft that causes the relative movement between the workpiece and the tool, and the pump,
daily power consumption in the operation standby OFF mode in the non-machining state separately for each of the display means and the at least one of the rotational drive shaft that rotatably supports the workpiece or the tool, the NC drive shaft that causes the relative movement between the workpiece and the tool, and the pump, and
daily power consumption separately for each of the display means and the at least one of the rotational drive shaft that rotatably supports the workpiece or the tool, the NC drive shaft that causes the relative movement between the workpiece and the tool, and the pump.

7. The power consumption display unit for a machine tool according to claim 3, wherein the display means displays at least:
total daily power consumption of the display means and the at least one of the rotational drive shaft that rotatably supports the workpiece or the tool, the NC drive shaft that causes the relative movement between the workpiece and the tool, and the pump in the operation standby mode in the non-machining state,
total daily power consumption of the display means and the at least one of the rotational drive shaft that rotatably supports the workpiece or the tool, the NC drive shaft that causes the relative movement between the workpiece and the tool, and the pump in the operation standby OFF mode in the non-machining state, and
total daily power consumption of the display means and the at least one of the rotational drive shaft that rotatably supports the workpiece or the tool, the NC drive shaft that causes the relative movement between the workpiece and the tool, and the pump.

8. The power consumption display unit for a machine tool according to claim 3, wherein the display means displays at least:
daily power consumption in the operation standby mode in the non-machining state separately for each of the display means and the at least one of the rotational drive shaft that rotatably supports the workpiece or the tool, the NC drive shaft that causes the relative movement between the workpiece and the tool, and the pump,
daily power consumption in the operation standby OFF mode in the non-machining state separately for each of the display means and the at least one of the rotational drive shaft that rotatably supports the workpiece or the tool, the NC drive shaft that causes the relative movement between the workpiece and the tool, and the pump, and
daily power consumption separately for each of the display means and the at least one of the rotational drive shaft that rotatably supports the workpiece or the tool, the NC drive shaft that causes the relative movement between the workpiece and the tool, and the pump.

9. The power consumption display unit for a machine tool according to claim 2, wherein the display means displays at least one of:
total daily power consumption of the multiple power-consuming components in the operation standby mode in the non-machining state,
total daily power consumption multiple power-consuming components in the operation standby OFF mode in the non-machining state, and
total daily power consumption multiple power-consuming components.

10. The power consumption display unit for a machine tool according to claim 9, wherein the display means displays at least one of:

daily power consumption in the operation standby mode in the non-machining state separately for each of the multiple power-consuming components, daily power consumption in the operation standby OFF mode in the non-machining state separately for each of the multiple power-consuming components, and daily power consumption separately for each of the multiple power-consuming components.

11. The power consumption display unit for a machine tool according to claim 2, wherein the display means displays at least one of:

daily power consumption in the operation standby mode in the non-machining state separately for each of the multiple power-consuming components, daily power consumption in the operation standby OFF mode in the non-machining state separately for each of the multiple power-consuming components, and daily power consumption separately for each of the multiple power-consuming components.

12. The power consumption display unit for a machine tool according to claim 2, wherein the display means displays at least:

total daily power consumption of the multiple power-consuming components in the operation standby mode in the non-machining state, total daily power consumption multiple power-consuming components in the operation standby OFF mode in the non-machining state, and total daily power consumption multiple power-consuming components.

13. The power consumption display unit for a machine tool according to claim 12, wherein the display means displays at least:

daily power consumption in the operation standby mode in the non-machining state separately for each of the multiple power-consuming components, daily power consumption in the operation standby OFF mode in the non-machining state separately for each of the multiple power-consuming components, and daily power consumption separately for each of the multiple power-consuming components.

14. The power consumption display unit for a machine tool according to claim 2, wherein the display means displays at least:

daily power consumption in the operation standby mode in the non-machining state separately for each of the multiple power-consuming components, daily power consumption in the operation standby OFF mode in the non-machining state separately for each of the multiple power-consuming components, and daily power consumption separately for each of the multiple power-consuming components.

15. The power consumption display unit for a machine tool according to claim 1, wherein the display means displays at least one of:

total daily power consumption in the operation standby mode in the non-machining state, total daily power consumption in the operation standby OFF mode in the non-machining state, and total daily power consumption.

16. The power consumption display unit for a machine tool according to claim 15, wherein the display means displays at least one of:

daily power consumption in the operation standby mode in the non-machining state separately for each of the second and third power-consuming element, daily power consumption in the operation standby OFF mode in the non-machining state separately for each of the second and third power-consuming element, and daily power consumption separately for each of the second and third power-consuming element.

17. The power consumption display unit for a machine tool according to claim 1, wherein the display means displays at least one of:

daily power consumption in the operation standby mode in the non-machining state separately for each of the second and third power-consuming element, daily power consumption in the operation standby OFF mode in the non-machining state separately for each of the second and third power-consuming element, and daily power consumption separately for each of the second and third power-consuming element.

18. The power consumption display unit for a machine tool according to claim 1, wherein the display means displays at least:

total daily power consumption in the operation standby mode in the non-machining state, total daily power consumption in the operation standby OFF mode in the non-machining state, and total daily power consumption.

19. The power consumption display unit for a machine tool according to claim 18, wherein the display means displays at least:

daily power consumption in the operation standby mode in the non-machining state separately for each of the second and third power-consuming element, daily power consumption in the operation standby OFF mode in the non-machining state separately for each of the second and third power-consuming element, and daily power consumption separately for each of the second and third power-consuming element.

20. The power consumption display unit for a machine tool according to claim 1, wherein the display means displays at least:

daily power consumption in the operation standby mode in the non-machining state separately for each of the second and third power-consuming element, daily power consumption in the operation standby OFF mode in the non-machining state separately for each of the second and third power-consuming element, and daily power consumption separately for each of the second and third power-consuming element.

* * * * *